United States Patent [19]

Fujii

[11] Patent Number: 4,997,509

[45] Date of Patent: Mar. 5, 1991

[54] APPARATUS FOR CONTROLLING THE START OF COATING ADHESIVE

[75] Inventor: Hiroshi Fujii, Hiroshima, Japan

[73] Assignee: Mazda Motor Corporation, Hiroshima, Japan

[21] Appl. No.: 343,648

[22] Filed: Apr. 27, 1989

[30] Foreign Application Priority Data

Apr. 30, 1988 [JP] Japan ............................... 63-108438

[51] Int. Cl.[5] ........................ B32D 31/00; B62D 65/00

[52] U.S. Cl. .................................... 156/364; 156/366; 156/368; 901/7; 901/43

[58] Field of Search ....................... 901/43, 7; 156/363, 156/364, 366, 368

[56] References Cited

U.S. PATENT DOCUMENTS 4,789,417 12/1988 Komatsu et al. .................. 901/7 X
4,875,955 10/1989 Fujii ............................... 156/366 X

FOREIGN PATENT DOCUMENTS 61-130386 6/1986 Japan .................................. 156/366

*Primary Examiner*—Robert L. Lindsay
*Attorney, Agent, or Firm*—Fish & Richardson

[57] ABSTRACT

A substrate and an article to be assembled with the substrate are conveyed separately to an assembly station in which they are assembled. A conveyor line conveying the substrates to the assembly station is provided with an adhesive coating station where the substrate is coated with an adhesive. A conveyor line conveying the articles is provided with a conveyance velocity detection means for detecting a conveyance velocity at which the article is conveyed. A timing in which the substrate starts being coated with the adhesive by an adhesive coating means is adjusted in accordance with a change in the conveyance velocity. A period of time required from a time for the start of coating the adhesive to a time for the start of assemblying the substrate with the article is made constant by adjusting the timing of the start of coating the adhesive.

17 Claims, 14 Drawing Sheets

APPARATUS FOR CONTROLLING THE START OF COATING ADHESIVE

BACKGROUND OF THE INVENTION

1. Field of the Invention

The present invention relates to an apparatus for controlling the start of coating substrates with an adhesive and, more particularly, such an apparatus adapted to coat the adhesive on the substrates which, in turn, are assembled with an article conveyed one after another.

2. Description of Related Art

Technology of assembling substrates coated with an adhesive in advance with an article conveyed one after another includes, for example, an assembly of window glass panels with a vehicle body, as disclosed in U.S. Pat. No. 4,453,303. As the window glass panels are assembled with the vehicle body conveyed on a conveyor line, the conveyor line is provided with a window glass panel assembly station where a window glass panel assembly robot is disposed. To the window glass panel assembly station is connected a window glass panel conveyor line for supplying window glass panels to the robot, and this line is provided with an adhesive coating robot for coating the window glass panels with an adhesive. After the window glass panels are coated with the adhesive, the glass panels are transferred to the window glass panel assembly robot which, in turn, assembles the glass panels with the vehicle body.

In the assembly of the window glass panels with the vehicle body, it is important to timely match a timing of conveying the window glass panels with the timing of conveying the vehicle body. The vehicle bodies are conveyed via a conveyor line different from the conveyor line on which the window glass panels are conveyed so that the window glass panels to be assembled with the vehicle body should be conveyed in the window glass panel assembly line in a good time to be timely matched with the vehicle bodies to be conveyed one after another in the assembly station, enabling the assembly of the window glass panels with the body without a timely delay. Conventional technique involves synchronizing a conveyance tact of the window glass panels with the conveyance tact of the vehicle body.

In the assembly of vehicle bodies in the recent years, however, there is the growing tendency to assemble plural vehicle models on the same assembly line so that it is required to change the conveyance tact of the vehicle bodies several times a day. If the conveyance tact of the vehicle bodies would be changed in conventional techniques, a conveyance tact of the window glass panels should be changed so as to correspond to the tact system of the vehicle bodies. It should be noted, however, that the change of the conveyance tact of the window glass panels requires further changes of various steps involved with the conveyance of the glass panels, thus making control systems over a series of the steps complicated.

This is the issue, too, in applying an adhesive on substrates such as window glass panels to be conveyed in synchronization with the vehicle body conveyed one after another, on which the window glass panels are mounted.

SUMMARY OF THE INVENTION

Therefore, the present invention has the object to provide an apparatus for controlling the start of coating substrates with an adhesive capable of dealing with a change of a conveyance velocity of an article such as a vehicle body with which the substrates are assembled without complication of a control system over the conveyance step of the substrates.

The present invention is based on the basic recognition that attention to be paid most in changing a conveyance velocity of the article is directed to a management of time between from the start of coating the substrate with the adhesive to the assembly of the coated substrate with the article. An adhesive performance is generally said to undergo great influences from the time elapsing from exposure of the adhesive to air to a practical application to the mounting so that, if the management of time could be ensured, whatever change is made of the conveyance tact of the substrates does not constitute any obstacle to a practical assembly system.

Based on the above basic concept, the present invention is adapted to adjust a timing of the start of coating the substrate with the adhesive in accordance with a change in a conveyance velocity of the article with which the substrate is assembled, thus constantly equalizing the time required from the start of application of the adhesive to the substrate to the assembly of the substrate with the article. Thus the present invention enables a uniform adhesive performance of an adhesive to be maintained without complication of a control system over the conveyance step of the substrates even if the conveyance velocity of the article would be changed in different ways.

In order to achieve the object, the present invention consists of an apparatus for controlling the start of coating a substrate with an adhesive prior to the assembly of the substrate with an article being conveyed one after another, comprising:

- an adhesive coating means for coating the substrate with the adhesive;
- a conveyance velocity detection means for detecting a conveyance velocity at which the article is conveyed; and
- a timing adjustment means for adjusting a timing in which the adhesive starts being coated on the substrate by the adhesive coating means so as to make constant a period of time required from a time for the start of coating the adhesive to a time for the start of assembling the substrate with the article in accordance with a variation in the conveyance velocity of the article.

BRIEF DESCRIPTION OF THE DRAWINGS

The other objects, features and advantages of the present invention will become apparent in the course of the description of the preferred embodiments which follows in the light of the accompanying drawings, in which.

DESCRIPTION OF THE PREFERRED EMBODIMENTS

The present invention will be described by way of examples in conjunction with the accompanying drawings. The examples are directed to application of the apparatus according to the present invention to an assembly step of vehicle window glass panels.

Layout of Window Glass Panels Assembly Step

Figure 1:
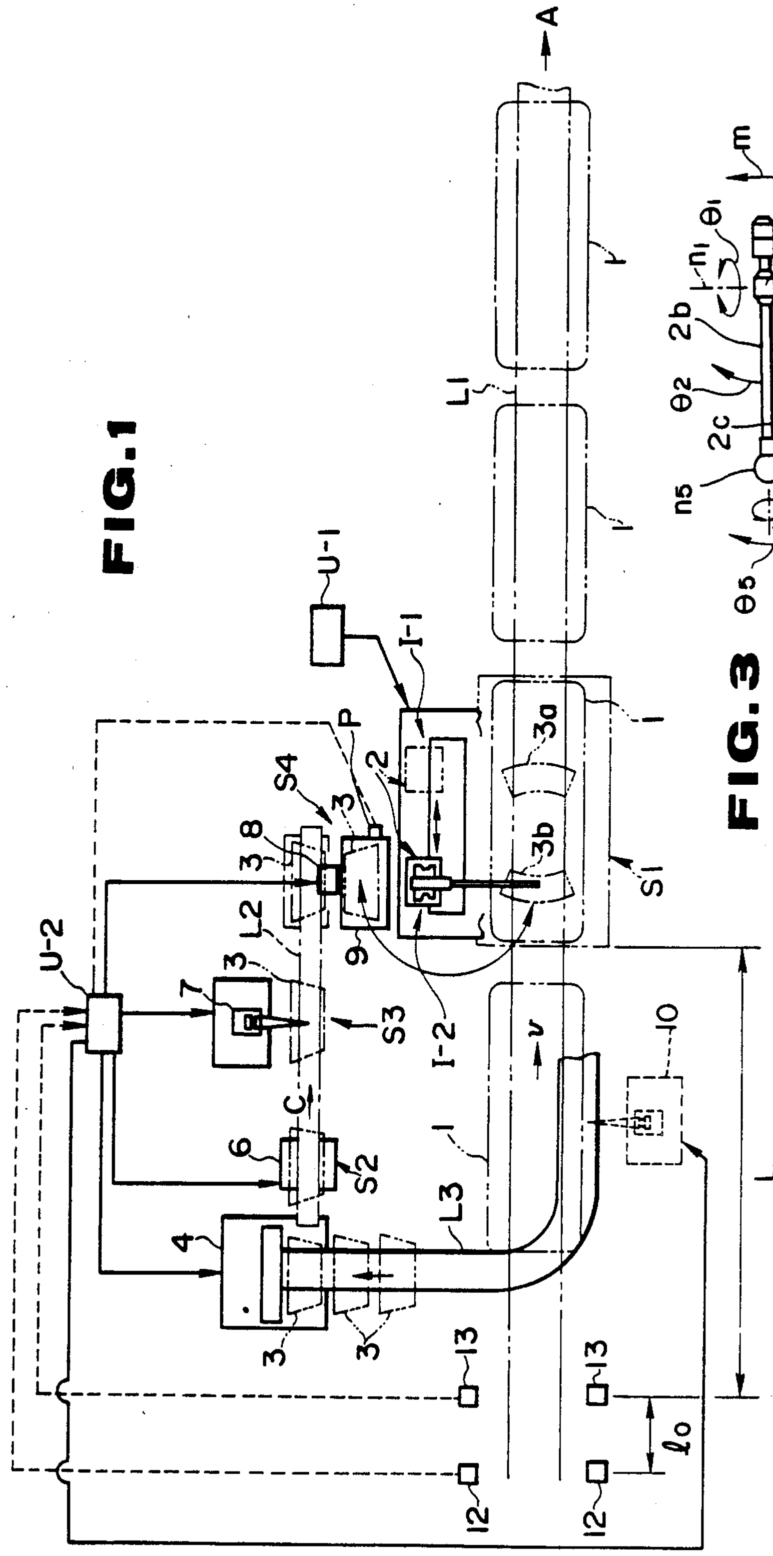
FIG. 1 is a schematic diagram showing a layout of the window glass panel assembly step for assembling window glass panels are assembled with the vehicle body.

Referring to FIG. 1, reference symbol L1 denotes a vehicle body conveyor line which is designed to convey plural different models of vehicle bodies. Vehicle bodies 1 are conveyed intermittently in a pitch in a direction indicated by the arrow A in parallel to the vehicle body conveyor line L1 which, in turn, is provided with a window glass panel mounting station S1. In the window glass panel mounting station S1, window glass panels 3 are automatically mounted by a window glass panel mounting robot 2 on vehicle bodies which are conveyed one by another. The robot 2 is designed so as to mount a forward window glass panels 3*a* and a rearward window glass panel 3*b* by itself in a manner as will be described in detail hereinbelow.

The window glass panels 3 are fed to the station S1 through a main window glass panel conveyor line L2 and a preliminary window glass panel conveyor line L3. The conveyor line L2 is connected to the conveyor line L3 by a vertical conveyor 4 which is designed so as to upwardly convey window glass panels 3.

The main window glass panel conveyor line L2 is to deliver the window glass panels 3 directly to the window glass panel mounting station S1 and is disposed, for example, on a second floor of a housing together with the station S1. The conveyor line L2 is provided with a window glass panel positioning station S2, an adhesive coating station S3, and a window glass panel inverting station S4 in a direction in which the window glass panels 3 are conveyed—in a direction as indicated by arrow C—in this sequence from the upstream side to the downstream side of the conveyor line. A positioning device 6 is disposed in the station S2, and an adhesive coating robot 7 is disposed in the station S3, which is designed so as to coat an adhesive B (FIG. 9) on the window glass panels 3 being conveyed one after another. In the station S4, an inverting device 8 is disposed to turn the window glass panels 3 to allow its surface with the adhesive B coated to face downwardly and the window glass panels are then transferred to a feed table 9 through which the glass panels 3 are fed to the window glass panels mounting robot 2.

The preliminary window glass panel conveyor line L3 is to deliver window glass panels 3 to the main window glass panel conveyor line L2 and is disposed, for example, on the first floor or ground floor of the housing in such a manner that it is connected to the main conveyor line L2 with the vertical conveyor 4. In the preliminary conveyor line L3 is provided a primer coating robot 10 which coats a primer P (FIG. 9) on the window glass panels 3 which are conveyed in a direction as indicated by the arrow in the drawing.

In the course of conveyance, the window glass panels 3 are first coated with the primer P in the preliminary window glass panel conveyor line L3 and transferred to the main window glass panel conveyor line L2 through the vertical conveyor 4. The glass panels 3 transferred are then coated with the adhesive B in the adhesive coating station S3 and thereafter transferred to the window glass panel inverting station S4 where the window glass panels 3 are turned so as to allow their surfaces with the adhesive B coated to be directed downwardly and are placed on the feed table 9 for feeding the glass panels 3 to the window glass panel mounting robot 2. Briefly speaking, the window glass panels 3 are fed one after another to the robot 2 through the preliminary conveyor line L3 and the main conveyor line L2 in such a state of being in pairs of the forward window glass panels 3*a* and the rearward window glass panels 3*b*.

Window Glass Panel Mounting Robot

Figure 3:
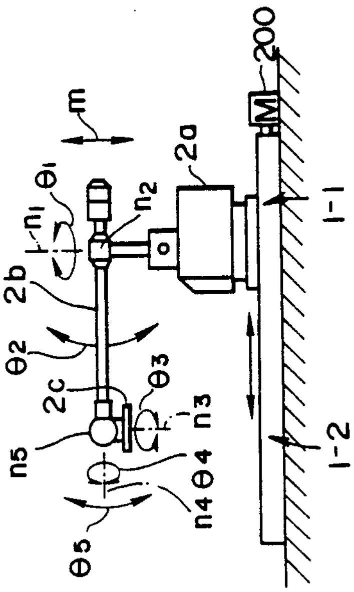
FIG. 3 is a side view showing briefly the window glass panel assembly robot for assembling the window glass panels with the vehicle body.
Figure 2:
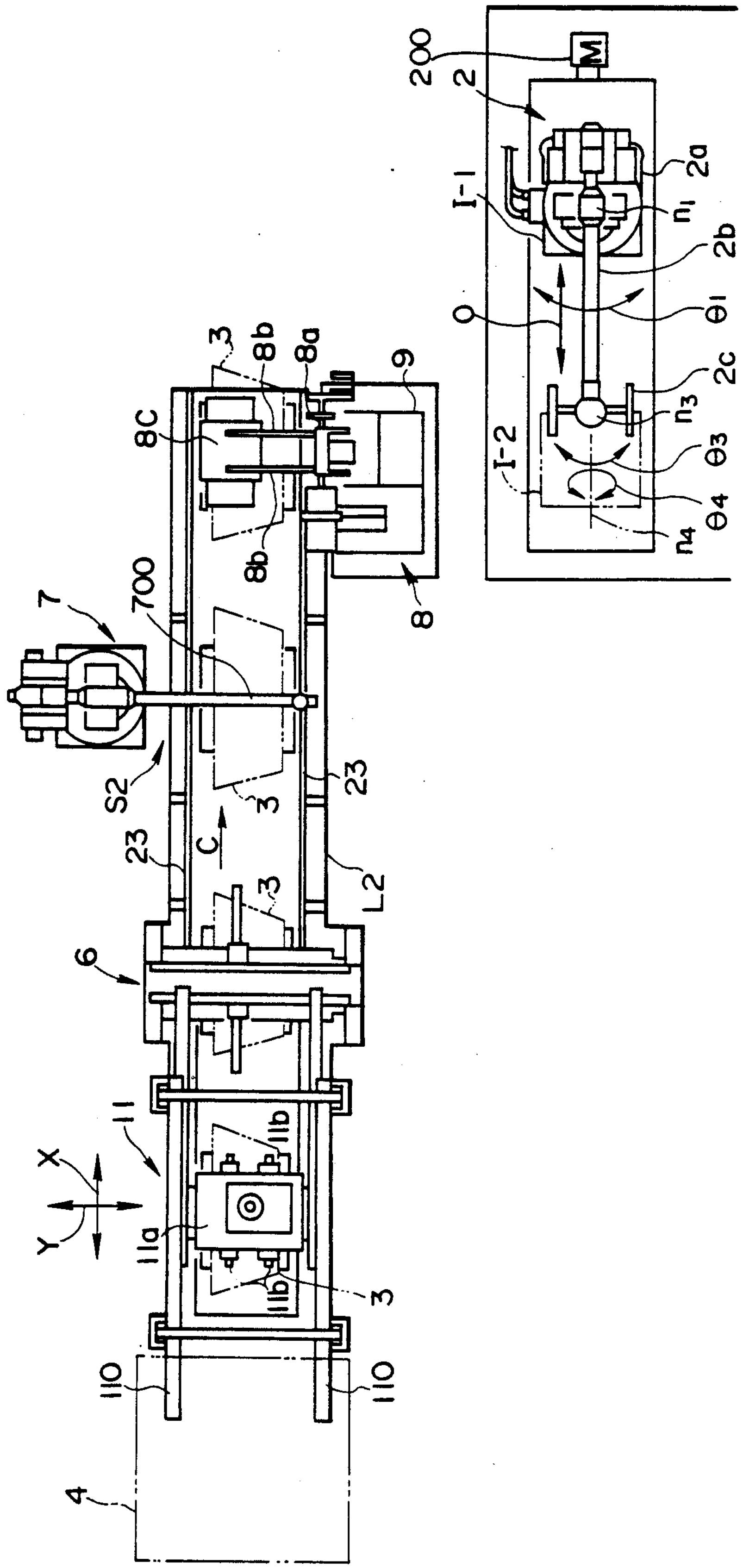
FIG. 2 is a plane view looked from the above at a main window glass panel conveyer line and the window glass panel assembly robot.

As shown in FIGS. 2 and 3, the window glass panel mounting robot 2 comprises a base portion 2*a*, an arm member 2*b*, and a glass panel holding portion 2*c*. The arm member 2*b* is mounted on the base portion 2*a* and is movable in a vertical direction as indicated by the arrow m and pivotable about an axis n1 in a direction as indicated by the arrow $\theta$ 1 and about an axis n2 in a direction as indicated by the arrow $\theta$ 2, and the glass panel holding portion is mounted on an end portion of the arm member 2*b* and is pivotable about an axis n3 in a direction as indicated by the arrow $\theta$ 3 and about an axis n4 in a direction as indicated by the arrow $\theta$ 4 as well as about an axis n5 in a direction as indicated by the arrow $\theta$ 5. The window glass panel mounting robot 2 is movable by means of a transferal mechanism by a motor 200 or by other means between a forward window glass panel mounting position I-1 and a rearward window glass panel mounting position I-2.

Figure 4:
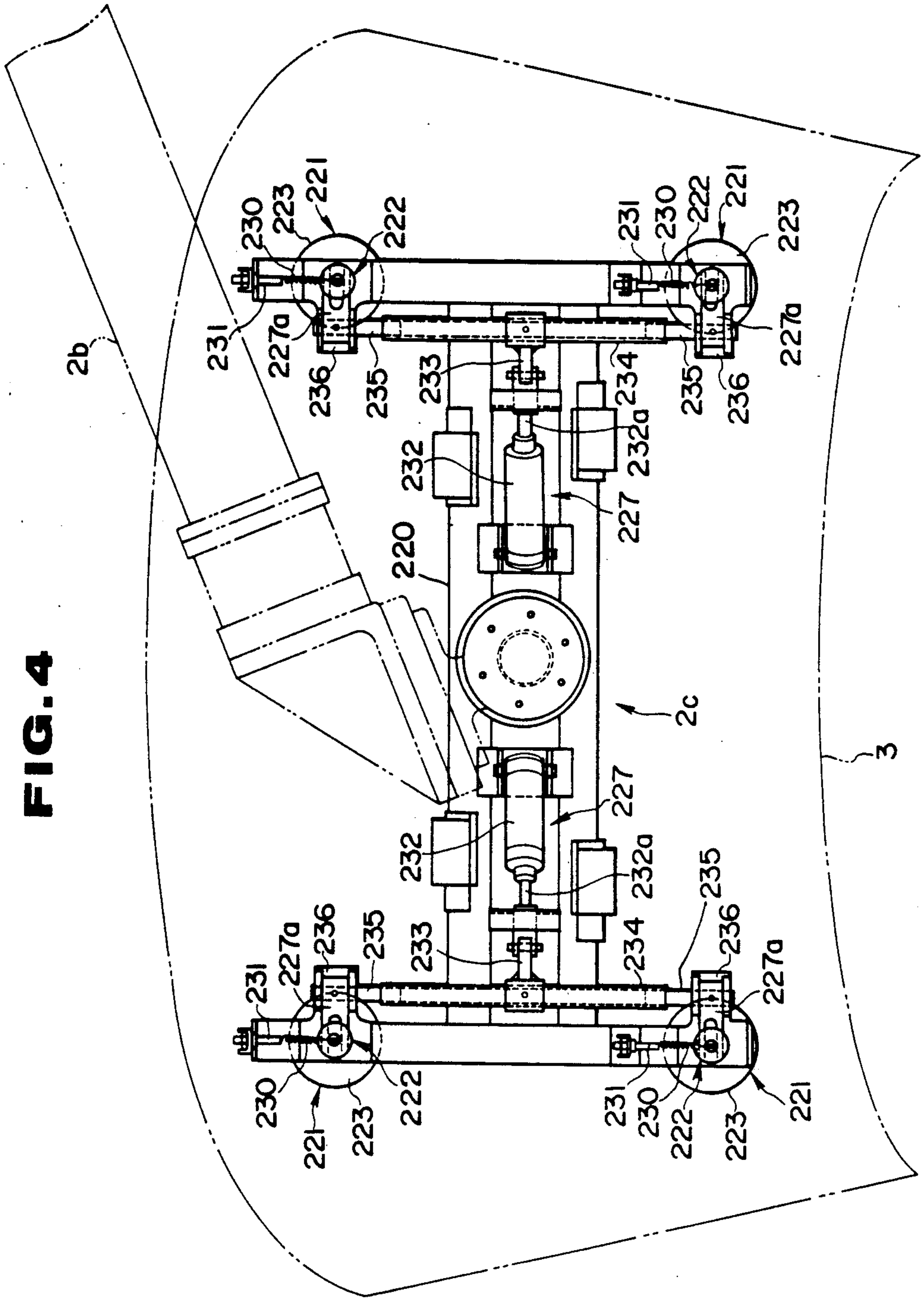
FIG. 4 is a bottom view looked from the below at a glass panel holding portion mounted at an arm end of the window glass panel assembly robot and describing a partial portion of the robot.
Figure 5:
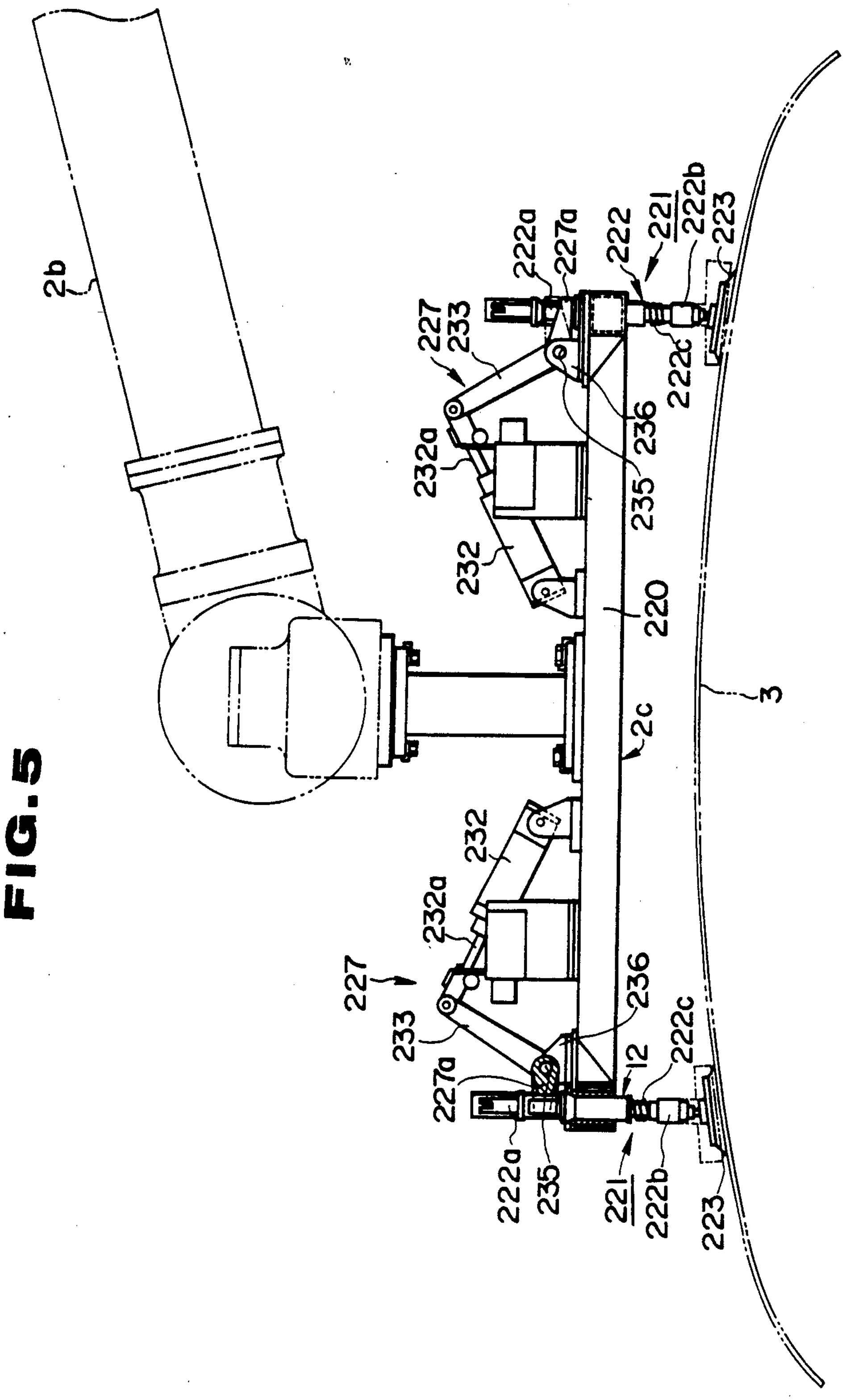
FIG. 5 is a side view of FIG. 4.
Figure 6:
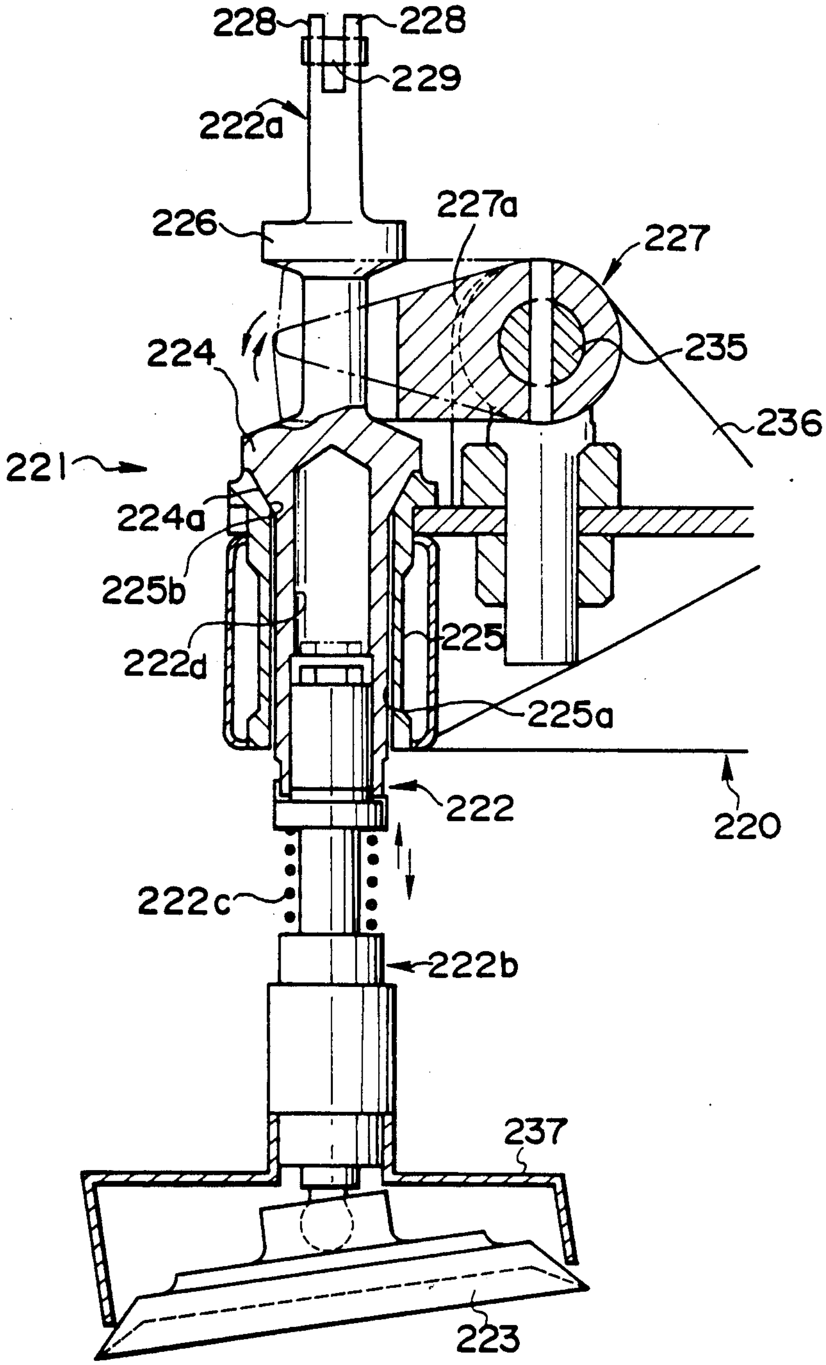
FIG. 6 is a partially enlarged side view showing a holding means by suction mounted on the glass panel holding portion of the robot.

Referring now to FIGS. 4 to 6, the glass panel holding portion 2c is shown to comprise a frame member 220 which is in a vertically H-shaped form and is supported at its middle portion by the arm member 2b in a suspended state. At four corners of the frame member 220 is mounted each an a sucker means 221 in suspended state.

As shown in FIG. 6, the sucker means 221 is provided with a rod 222 extending in a vertical direction which, in turn, comprises a first rod member 222a consisting of the upper half of the rod 222 and a second rod member 222b consisting of the lower half thereof. At a lower end of the second rod member 222b is mounted a sucking pad 223 which is pivotable about an axis of the rod 222, i.e., the second rod member 222b. An upper portion of the second rod member 222b is slidably inserted vertically into a hole 222d formed on an lower end portion of the first rod member 222a and the second rod member 222b is always urged in a downward direction as indicated by the solid line in the drawing, namely, in a direction apart from the first rod member 222a, by means of a spring force of a spring 222c mounted in a compressed state in a vertical direction at a middle portion of the second rod member 222b. The first rod member 222a is provided at its middle position in a vertical direction with an engaging expansion portion 224 formed in an expanded state outwardly in a radial direction, and the engaging portion 224 is provided at its lower portion with a tapered surface 224a tapered downwardly. At four corners of the frame member 220 is fixed each a cylindrical support member 225 having a through hole 225a extending in its vertical direction, and a tapered surface 225b is formed at an upper portion of the through hole 225a. The tapered surface 225b is engageable with the tapered surface 224a of the first rod member 222a. An engagement of the tapered surface 224a with the tapered surface 225b permits a support of the sucker means 221 in a suspended state from the frame member 220. At an upper position of the engaging expansion portion 224 of the first rod member 222a is formed a flange portion 226 expanded outwardly in a radial direction, and a U-shaped tip portion of a paw 227a of a regulation means 227, as will be described hereinafter, is engaged between the flange portion 226 and the expansion portion 224.

At an upper end of the first rod member 222a is formed a branch portion 228 where the rod member is branched into two sections. At the branch portion 228 is bridged a pin 229 which is connected to one end of a draft spring 230. The other end of the draft spring 230 is connected to a pin 231 mounted on the frame member 220 in a horizontally projecting manner, whereby the rod 222 of the sucker means 221 is urged by the draft spring 230 in a horizontal direction toward the pin 229.

On an upper surface at the middle portion of the frame member 220 are symmetrically disposed control means 227 for controlling a suspended state of the sucker means 221 at left-hand and right-hand positions. Each of the control means 227 is provided with a hydraulic pressure cylinder 232 extending toward the side of the frame member 220, and a tip portion of a piston rod 232a of the hydraulic pressure cylinder 232 is connected to a horizontal cylinder member 234 at a middle portion in a lengthwise direction, the cylinder member 234 extending in a direction perpendicular to the hydraulic pressure cylinder 232 through a link 233. At the both ends of the horizontal cylinder member 234 is inserted and fixed a connecting rod 235 at its one end side, the connecting rod 235 is pivotably supported at its other end side by a bracket 236 which is fixed to the frame member 220. At the other end of the connecting rod 235 is fixed a base portion of the control paw 227a. In FIG. 6, reference numeral 237 denotes a stopper member for controlling an excessive degree of an upward transformation of the sucking pad 223.

At the pre-stage for mounting the window glass panels on window openings of the vehicle body, the cylinder 232 is in compressed state and the control paw 227a is in a state in which it is upwardly pivoted about the connecting rod 235 in such a manner as indicated by the imaginary line as shown in FIGS. 5 and 6. This contruction brings a pressing action against the extension portion 224 of the first rod member 222a to be in released state, and the spring force of the spring 222c displaces the first rod member 222a, thus bringing the tapered surfaces 224a and 225b into disengaged state and, as a result, the sucker means 221 (rod 222) into suspended state.

At the stage of mounting the window glass panels, the hydraulic pressure cylinder 232 is operated to extend and controls the floating state of the sucker means 221 of the rod 222. The window glass panel 3 is pressed against the vehicle body 1 in this state.

The determination of the positions of the window glass panel 3 against the vehicle body 1 may be effected by engaging a positioning pin such as a stad bolt or the like mounted on each of the both sides of the window glass panel 3 with a positioning hole formed on the side of the vehicle body 1 in conventionally known manner.

The positioning hole on the vehicle body 1 may be detected by a visible sensor mounted, for example, on the frame member 220.

As the sucker means 221 is in suspended state at the pre-stage for mounting the window glass panel 3 on the vehicle body 1, it presents the advantages that the position of the window glass panel 3 can be readily determined at the time of actually mounting the window glass panel 3 on the vehicle body 1. In other words, the positioning pin mounted on the window glass panel 3 serves as a guide member when it is inserted into the positioning hole formed on the side of the vehicle body 1 and enables the window glass panel 3 to be quickly fitted at a given position of the vehicle body 1.

The window glass panel mounting robot 2 is operated to initially mount the forward window glass panel 3a at the front window glass panel mounting position I-1 and then transferred to the rear window glass panel mounting position I-2 where the rearward window glass panel 3b is mounted by the robot 2.

As shown in FIG. 2, the robot 2 is located at the rear window glass panel mounting position I-2 and the arm member 2b and window glass panel holding portion 2c of the robot 2 are appropriately transferred and pivoted to hold a forward window glass panel 3a which has been transferred to the feed table 9 after coating. Then the robot 2 is transferred to the front window glass panel assembly position I-1 where the forward window glass panel 3a is assembled on the vehicle body 1 by appropriately transferring and pivoting its arm member 2b and holding portion 2c as the body 1 is conveyed and suspended in the window glass panel mounting station S1. During the assembly of the forward window glass panel 3a, a rearward window glass panel 3b is coated with the adhesive B in the station S3 and turned by the inverting device 8 so as to allow the coated surface of the glass panel to face downwardly. After the assembly of the forward window glass panel 3*a*, then the robot 2 is transferred to the rear window glass panel assembly position I-2 where the arm member 2*b* and holding portion 2*c* thereof are appropriately transferred and pivoted to hold the rearward window glass panel 3*b* placed and then appropriately transferred and pivoted to assemble the rearward window glass panel 3*b*. After completion of the assembly of the forward and rearward window glass panels 3*a* and 3*b*, respectively, the vehicle body 1 is then conveyed in the direction as indicated by the arrow A. At the same time, the robot 2 is operated to hold a forward window glass panel 3*a* for a vehicle body which follows in the same manner as have been described hereinabove.

With this arrangement, the window glass panel assembly robot 2 mounts the forward window glass panel 3*a* in the front window glass panel assembly position I-1 located in a distance away from the feed table 8 prior to the mounting of the rearward window panel 3*b* while the robot 2 is transferred between the front and rear window glass panel assembly positions I-1 and I-2, respectively. Thus a spare time during the vehicle bodies are conveyed in a pitch can be utilized effectively for transferring the robot 2 with the forward window glass panel 3*a* held by its arm member 2*b* to the front window glass panel assembly position I-1 and being on the standby for the next coming vehicle body 1. Thus it is possible to save time to be required for preparation for the assembly of the forward window glass panel 3*a* and consequently a time for the assembly of the window glass panels can be shortened.

Inverting Device 8

As shown in FIG. 2, the inverting device 8 comprises an arm 8*b* rotatable about a horizontal axis 8*a*, and a glass panel holding portion 8*c* disposed at a tip portion of the arm 8*b*. The glass panel holding portion 8*c* can hold the window glass panel 3 nd the arm 8*b* is turned upwardly at the angle of 180 degrees while the glass panel 3 is held by the holding portion 8*c*, thus inverting the coated surface of the glass panel 3 which faces upwardly so as to face in a downward direction. Thereafter, the window glass panel 3 is transferred to the feed table 9.

Adhesive Coating Robot 7

Figure 7:
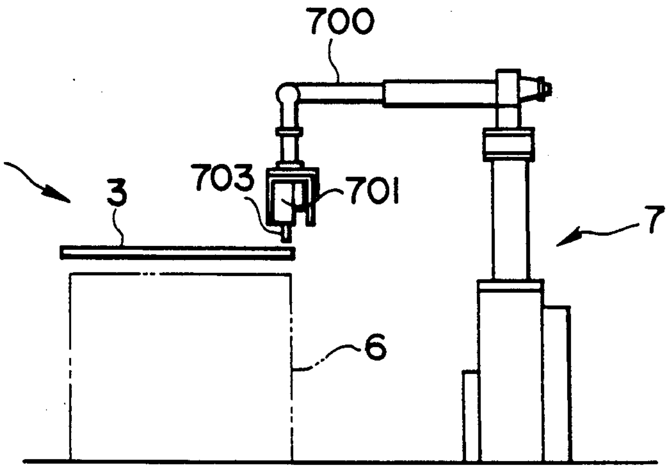
FIG. 7 is a side view showing briefly an adhesive coating robot for coating the window glass panel with an adhesive, mounted on the main window glass panel conveyor line.
Figure 8:
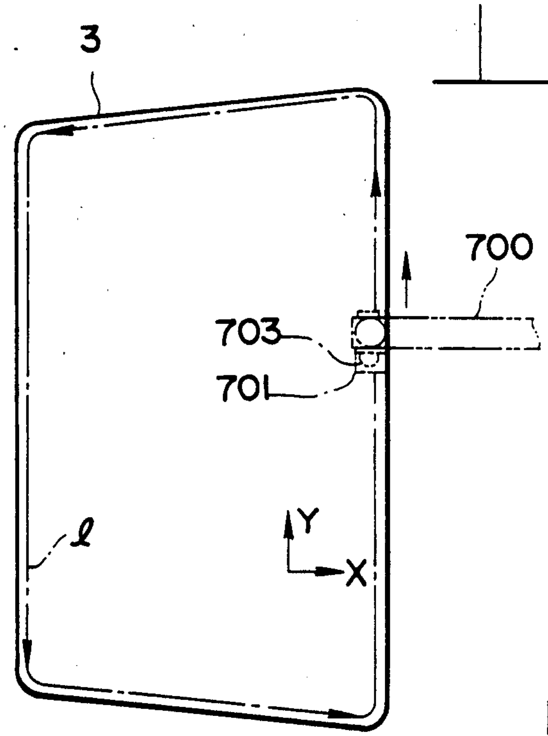
FIG. 8 is a front view showing an adhesive coating line for coating the window glass panels with the adhesive.
Figure 9:
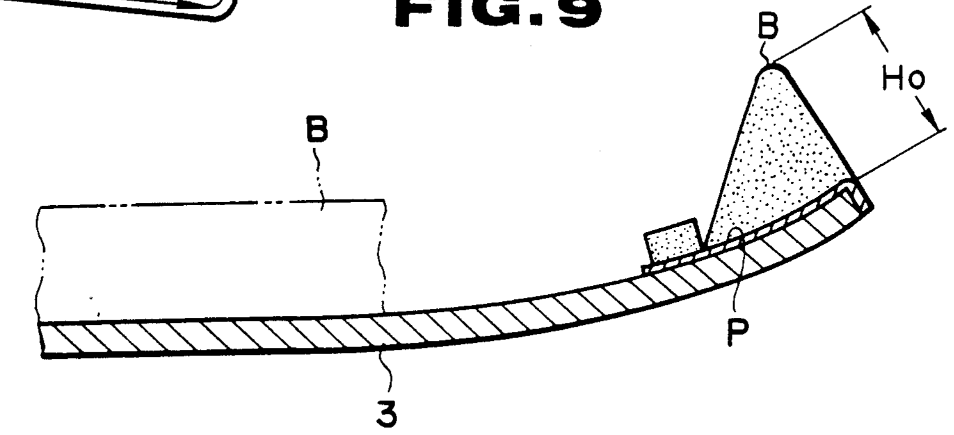
FIG. 9 is a cross-sectional view showing the window glass panel coated with the adhesive.

Referring now to FIGS. 2 and 7, the adhesive coating robot 7 comprises a work arm 700 and a drive member 701 capable of approaching to a horizontal surface arbitrarily in an X- or Y-direction. The drive member 701 is provided with a nozzle 703 which, in turn, is transferable in a X-, Y- or Z-direction by the drive member 701 and can be inclined at an inclination angle $\theta$ with respect to the horizontal surface. This construction of the robot 7 permits the nozzle 703 to face the window glass panel 3 on the line l on which it is fixed to the vehicle body 1 and the adhesive B, for example, a polyurethane sealer, is coated to a given thickness Ho on the line l, as shown in FIG. 9. The arm 700 is then moved on the line l along the circumference of the window glass panel 3, thus coating the adhesive B along the line l.

Main Window Glass Panel Conveyor Line L2

Figure 10:
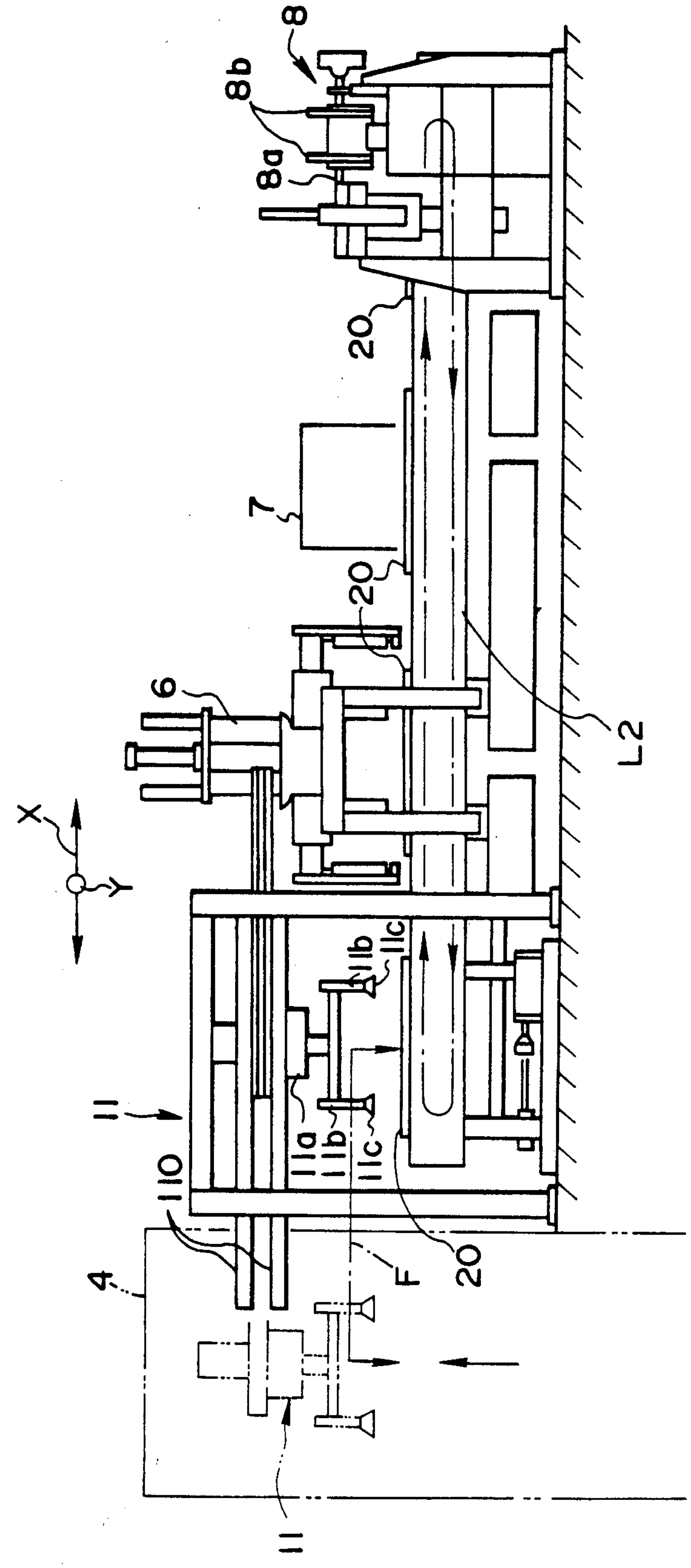
FIG. 10 is a side view showing the main window glass panel conveyor line corresponding to FIG. 2.

Referring to FIG. 2, the main window glass panel conveyor line L2 is shown to comprise a plurality of pallets 20 disposed in a spaced relationship in the direction as indicated by reference symbol C. The pallets 20 are connected to each other with an endless chain and are designed so as to be intermittently conveyed in a pitch by a drive means such as a cylinder (not shown). The window glass panel 3 is placed on the pallet 20 and it is transferred from the vertical conveyor 4 to the 1 main window glass panel conveyor line L2 using a carrier 11 as shown in FIGS. 2 and 10. It is to be noted herein that the carrier 11 is omitted from FIG. 1.

As shown in FIG. 10, the carrier 11 is guided by a rail 110 disposed in an area above the main window glass panel conveyor line L2 and is transferable between the vertical conveyor 4 and the main window glass panel conveyor line L2. The carrier 11 comprises a main body 11*a*, an arm 11*b* hanging down from the main body 11*a* and movable vertically by a drive means (not shown), and a vacuum cup 11*c* mounted on a lower end of the arm 11*b*, thus sucking and holding the window glass panel 3. The carrier 11 which has received the window glass panel 3 from the vertical conveyor 4 is then transferred on the main window glass panel conveyor line L2 in a locus of transferal indicated by reference symbol F in FIG. 10. Thereafter, the arm 11*b* of the carrier 11 is then transferred downwardly on the pallet 20 and the window glass panel 3 is loaded thereon, thus allowing the vacuum cup 11*c* to release the window glass panel 3.

The pallet 20 is provided on its upper surface with two pairs of height reference rods 201 and 202, respectively. In this embodiment, as the window glass panel 3 is placed in such a manner that its lengthwise direction are brought into agreement with the direction of conveyance indicated by reference symbol C, in which the pallet 20 is conveyed, one pair of the height reference rods 201 are mounted upright on one side of the pallet 20 in a spaced relationship in the direction C while the other pair of the height reference rods 202 are likewise mounted upright on the other side of the pallet 20 in a spaced relationship. It is further to be noted that the height reference rods 201 are fixed on the one side of the pallet 20 and the other pair of the height reference rods 202 are mounted transferably in a direction perpendicular to the direction of conveyance C in which the window glass panels are conveyed in a manner as will be described more in detail hereinbelow.

Figure 11:
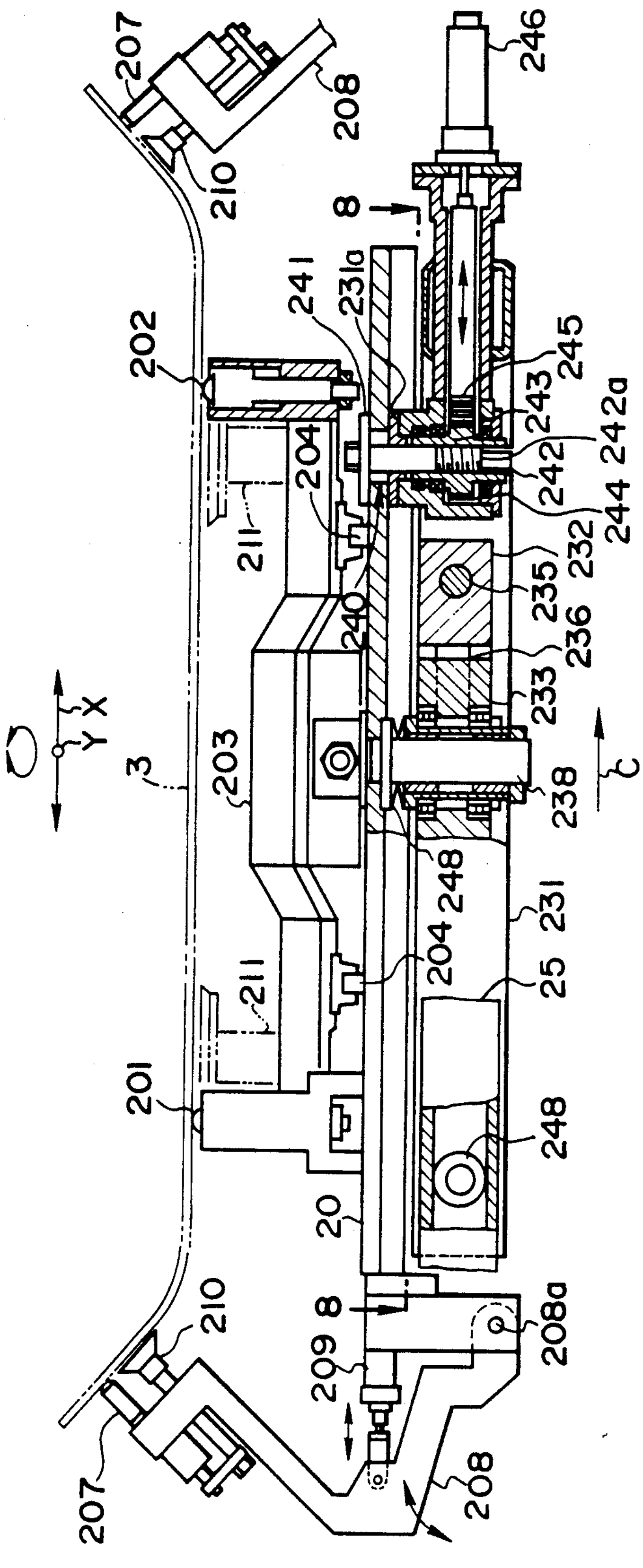
FIG. 11 is a side view of a pallet placing the window glass panel and mounted on the main window glass panel conveyor line, in which the pallet is partially cross-sectioned.
Figure 12:
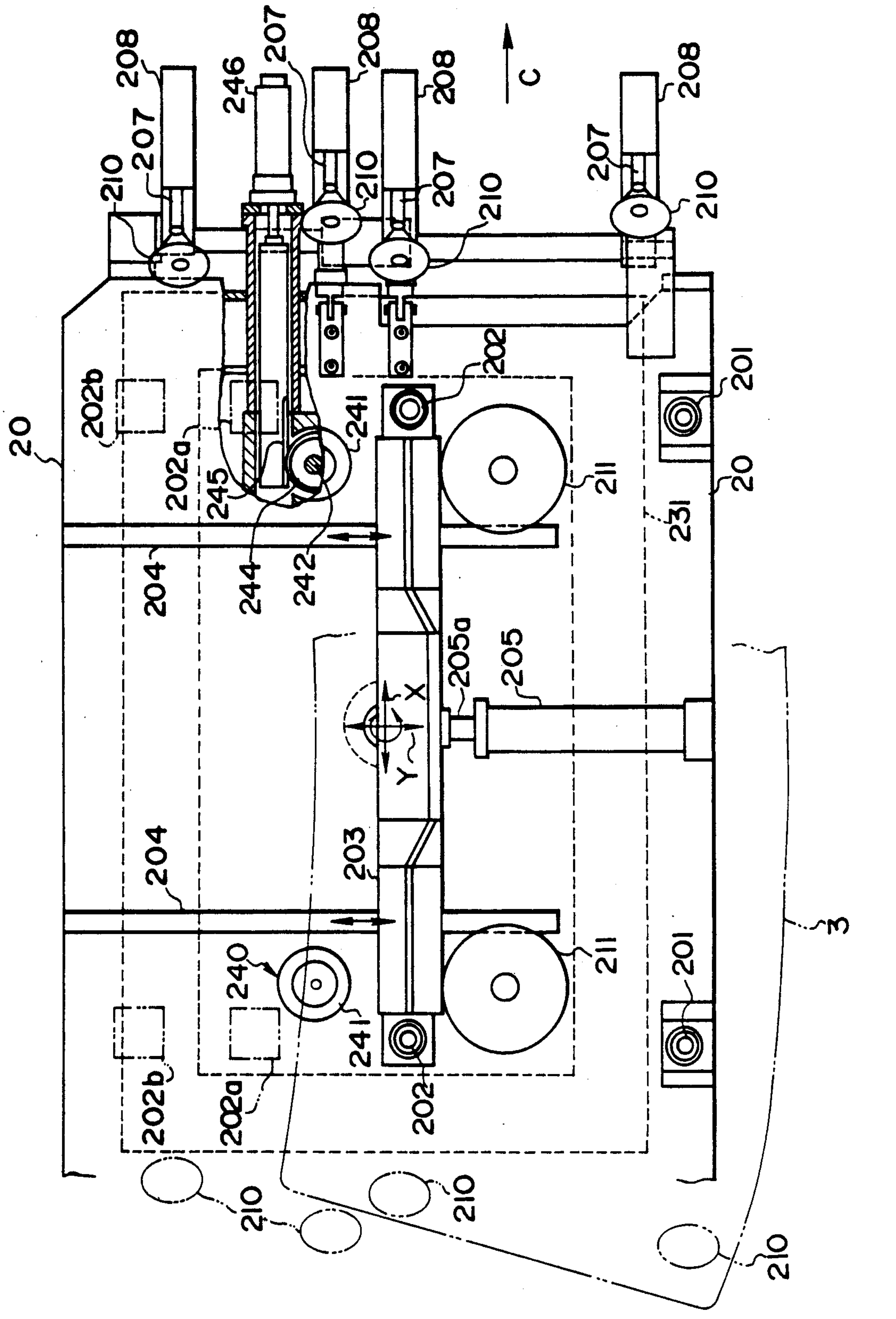
FIG. 12 is a plane view of the pallet of FIG. 11, when looked at from the above.

As shown in FIGS. 11 and 12, the other pair of the height reference rods 202 are disposed upright on one and the other sides of a connecting bar 203 which, in turn, is transferable on rails 204 in a direction perpendicular to the conveyance direction C of the window glass panels. As shown specifically in FIG. 12, the connecting bar 203 is connected at its middle portion to a piston rod 205*a* of a cylinder 205 and transferred by driving the cylinder 205, thus allowing the other pair of the height reference rods 202 to be moved. In this embodiment, for example, the other pair of the height reference rods 202 is movable to comply with the kind of the window glass panels to take a first position as indicated by the solid line in FIG. 12, a second position as indicated by the imaginary line 202*a*, and a third position as indicated by the imaginary line 202*b*.

As shown in FIG. 11, the pallet 20 is provided with pairs of reference rods 207 so as to abut with both end portions of the window glass panel 3 in its lengthwise direction, namely, a curved portion thereof. The pairs of the reference rods 207 are mounted on the pallet 20 through arms 208 a base portion of which is pivotable about its axis 208*a*. Each of the arms 208 is connected to respective cylinder 209 secured on each side portion of the pallet 20 and an extension or contraction of a pair of the cylinders 209 allows a pair of the arms 208 to move in a relative manner so as to become apart from or come closer to the window glass panel 3, thus eventually going the reference rods 207 apart from or abutting them with the glass panel 3 and dealing with a difference of curvatures of curved portions of the window glass panels 3.

Nearby each of the reference rods 207 on every arm 208 is mounted a vacuum cup 210 to suck and hold the window glass panel 3. Likewise, a pair of vacuum cups 211 are mounted upright on the pallet 20 to suck and support the window glass panel 3.

At the pre-stage in which the pallet 20 receives the window glass panel 3 from the carrier 11, the reference rods 202 and 207 are displaced to match with the kind of the window glass panel 3 to be received by the pallet 20. In particular, the reference rods 207 are set so as to match with a curved shape of a curved portion of the glass panel 3. Accordingly, the window glass 3 placed on the pallet 20 is sucked and held by the vacuum cups 210 and 211, thus dealing with a curvature of the curved portion of the glass panel 3.

The window glass panel 3 held on the pallet 20 is then conveyed to the window glass panel positioning station S2 where the position of the glass panel 3 placed on the pallet 20 is corrected by an association of the positioning device 6 with a displacement of the pallet 20.

Figure 13:
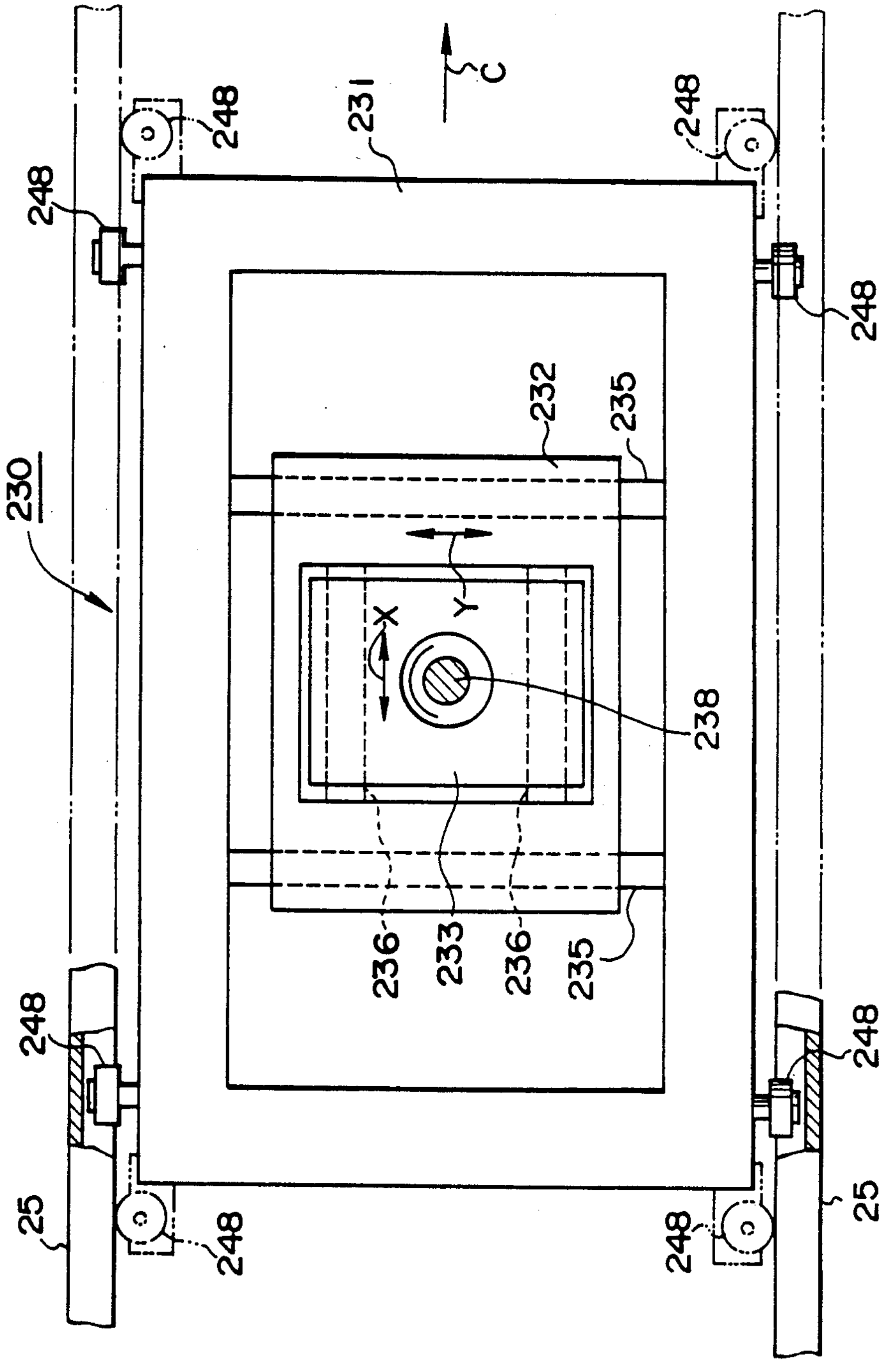
FIG. 13 is a plane view showing frame members serving as a base of the pallet, in which the pallet is excluded.

The pallet 20 is displaced in a manner as will be described hereinbelow. As shown in FIG. 13, the pallet 20 comprises a frame 230 as a base, which further comprises an outer frame section 231, an intermediate frame section 232, and an inner frame section 233. The outer frame section 231 is provided with a pair of first guide rods 235 that guide the intermediate frame section 232 surrounded by the outer frame section 231 so as to become displaceable in a direction indicated by reference symbol Y. The intermediate frame section 232 is provided with a pair of second guide rods 236 that, in turn, guide the inner frame section 233 surrounded by the intermediate frame section 232 so as to become displaceable in a direction indicated by reference symbol X. The inner frame section 233 is rotatably mounted at its center portion with a rotary shaft 238, and the pallet 20 is fixed on an upper end of the rotary shaft 238, as will be shown in FIG. 11. This construction allows the pallet 20 to be rotatable about the rotary shaft 238 and further displaceable in the X- and Y-directions.

Referring further to FIG. 11, the pallet 20 is fixed to the rotary shaft 238 of the frame 230 with a clamp means 240 which, in turn, is mounted on the outer frame section 231. The clamp means 240 basically comprises a recipient portion 231a disposed over the outer frame section 231 and a press member 241 disposed on the upper surface of the pallet 20. A downward displacement of the press member 241 clamps the pallet 20 from the downward and upward directions in association with the recipient portion 231a, thus fixing the pallet 20.

The clamp means 240 is constructed such that the press member 241 is loosely engaged with the pallet 20 and fixed to an upper end portion of a rod 242 passing therethrough in a vertical direction. On a lower end portion of the rod 242 is provided a screw portion 242a to be engageable with a female screw member 243 which, in turn, is rotatably mounted to the outer frame section 231. On an outer circumference of the female member 243 is provided a pinion 244 to be engageable with a rack 245 which, in turn, extends up to the outside of the outer frame section 231 and is connected at its outer side end to a cylinder 246. This construction permits a vertical movement of the rod 242 by an extension or compression of the cylinder 246, followed by a vertical movement of the press member 241, thus clamping or unclamping the pallet 20. The pallet 20 is constantly urged by a belleville spring (FIG. 11) mounted on the outer circumference of the rotary shaft 238.

Referring to FIG. 13, the pallet 20 is transferred in the conveyance direction C on a pair of guide rails 25 laid on the main window glass panel conveyor line L2 by rotating rollers 248 mounted on the outer frame section 231.

Figure 14:
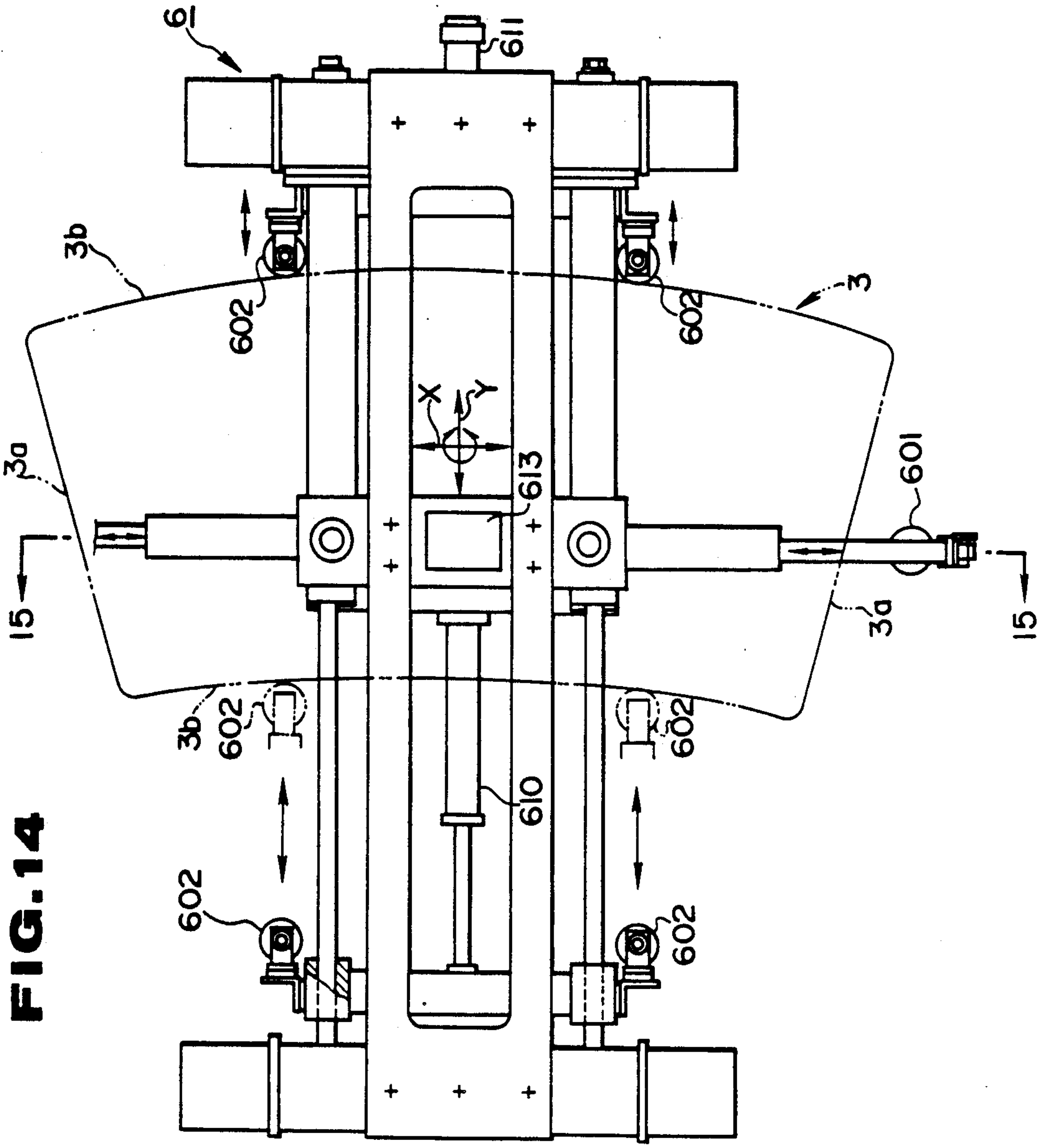
FIG. 14 is a plane view showing a positioning device for determining a position of the window glass panel prior to coating of the window glass panel with the adhesive.
Figure 15:
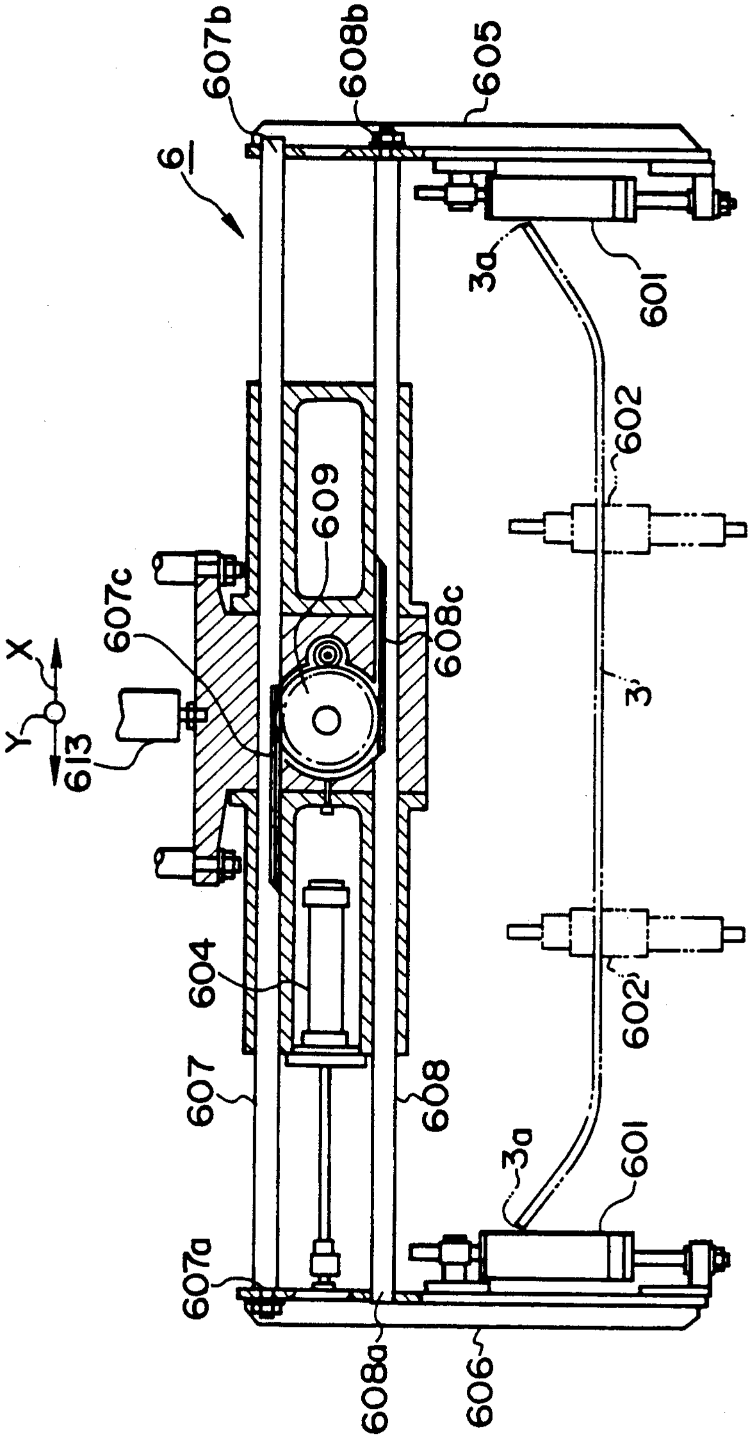
FIG. 15 is a partially cross-sectional side view showing the positioning device of FIG. 14.

Referring now to FIGS. 14 and 15, the positioning device 6 comprises a pair of first rollers 601 and two pairs of second rollers 602. The first rollers 601 are to determine an X-directional position of the window glass panel 3 by abutting with side end surfaces 3a thereof in its lengthwise direction, namely, in its X-direction, to be mounted in a transverse direction of the vehicle body 1, while the second rollers 602 are to determine a Y-directional position of the glass panel 3 by abutting with side end surfaces 3b thereof in a widthwise direction, namely, in its Y-direction, to be mounted in an upward direction thereof. More specifically, one of the first rollers 601 serves as positioning the left-hand side end 3a of the glass panel 3 while the other as positioning the right-hand side end 3a thereof, and one pair of the second rollers 602 serves as determining the position of the left-hand side end 3b of the glass panel 3 (to be mounted on an upper side thereof) while the other pair of the second rollers 602 as determining the position of the right-hand side end 3b thereof (to be mounted on a lower side thereof).

As shown specifically in FIG. 15, on the one hand, the first rollers 601 permit a relative displacement in the X-direction, i.e., in the lengthwise direction of the glass panel 3, by an extended or compressive movement of the cylinder 604. The first rollers 601 are held by a right-hand bracket 605 and a left-hand bracket 606 which are connected to each other with an upward guide rod 607 and a downward guide rod 608 mounted in a vertically spaced relationship. More specifically, a left-hand side 607a of the upward guide rod 607 is connected to the left-hand bracket 606 while the right-hand side 607b thereof is loosely engaged with the right-hand bracket 605. On the contrary, a left-hand side 608a of the downward guide rod 608 is loosely engaged with the left-hand bracket 606 while the right-hand side 608b thereof is fixed to the right-hand bracket 605. The upward and downward guide rods 607 and 608 are provided at their middle portion with racks 607c and 608c, respectively, between which is rotatably mounted a pinion 609. This construction allows the right-hand and left-hand first rollers 601 to depart from or approach to each other by means of an extension or compression of the cylinder 601.

As shown in FIG. 14, on the other hand, two pairs of the left-hand and right-hand second rollers 602 are displaced separately and independently in the Y-direction, i.e., in the widthwise direction of the window glass panel 3. In other words, a pair of the left-hand second rollers 602 are driven by a first cylinder 610 for the left-hand rollers while a pair of the right-hand second rollers 602 are driven by a second cylinder 611 for the right-hand rollers.

As shown in FIGS. 14 and 15, reference numeral 613 denotes a cylinder for raising or lowering the positioning device 6.

The pallet 20 is in a state of being clamped by the clamp means 240 in the stage when the window glass panel is conveyed thereinto. After the positioning by the positioning device 6 was completed, the pallet 20 is then clamped and fixed by the clamp means 240 and thereafter the glass panel 3 is transferred to the adhesive coating station S3.

As have been described hereinabove, the window glass panel 3 is corrected so as to be located at a given position in the stage prior to transferal to the adhesive coating station S3 so that the coating robot 7 can start coating the adhesive immediately upon conveyance of the window glass panel 3 into the station S3 without amendment to the position of the glass panel 3.

Overall Control

As shown in FIG. 1, in the conveyor line L1 of the vehicle bodies 1, a conveying tact of the bodies 1 is controlled by a host computer (not shown). A control unit U-1 for the window glass panel assembly robot 2 start operating the robot 2 in synchronization with conveyance of the vehicle body 1 into the window glass panel assembly station S1. The conveyor lines L2 and L3 are controlled by a control unit U-2 in response to a signal from a sensor P mounted on the feed table 9 to convey the window glass panel 3 in a pitch after the glass panel 3 was received by the robot 2.

Control over Adhesive Coating Robot 7

Referring to FIG. 1, the conveyor line L1 is provided on the upstream side of the window glass panel assembly station S1 with two sets of photo tube switches 12 and 13 which are disposed in a given distance, $l_o$, in a direction of conveyance of the conveyor line L1, thus capable of detecting a conveyance velocity V of the vehicle body passing through the photo tube switches 12 and 13. The conveyance velocity V of the vehicle body 1 is input in the control unit U-2. The robot 7 is designed so as to adjust a timing at which the adhesive B starts being coated, so as to make always constant ($T_o$) regardless of the conveyance velocity V, a period of time required for finishing the assembly of the window glass panel 3 with the vehicle body 1 from the start of coating the adhesive B.

Figure 16:
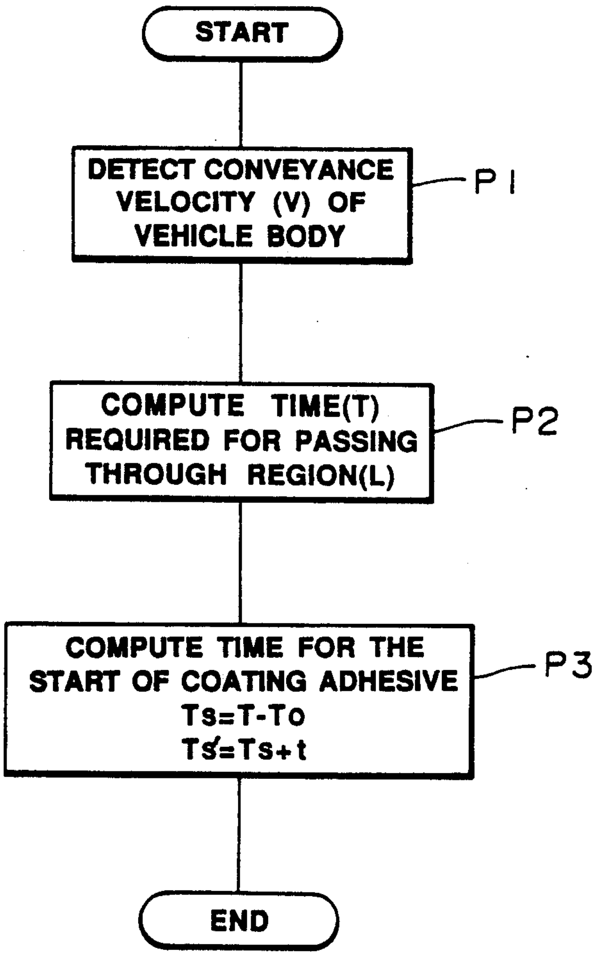
FIG. 16 is a flowchart showing an example of control over a timing of starting application of the adhesive to the window glass panel.
Figure 17:
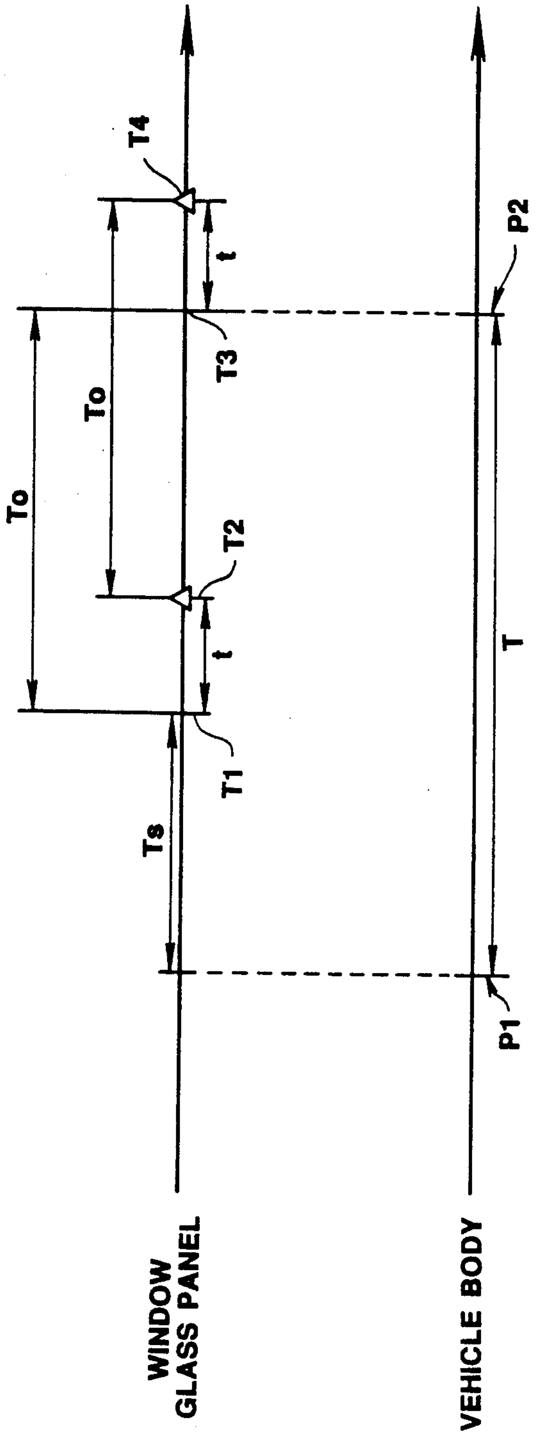
FIG. 17 is an explanation diagram for explaining a means for adjusting the timing of the start of application of the adhesive to the coating substrate.

More specifically, as shown in FIG. 16, the conveyance velocity V of the body 1 is detected at step P1, and an estimated time at which the body 1 pass through a region (L) from a position (P1) at the set of the photo tube switch 13 are disposed to an inlet position (P2) of the station S1 is computed on the basis of the velocity V at step P2. Then at step P3, as shown in FIG. 17, there are computed a time, $T_s$, at which the forward window glass panel 3 starts being coated with the adhesive B, and a time, $T_s'$, at which the rearward window glass panel 3 starts being coated therewith, the basis of the times T and $T_o$. In FIG. 17, reference symbol "t" denotes a time interval between the assembly with the forward window glass panel 3*a* and the rearward window glass panel 3*b*. In FIG. 17, reference symbol "T1" denotes the timing at which the forward window glass panel starts being coated, "T2" denotes the timing at which the rearward window glass panel starts being coated, "T3" denotes the timing at which the forward window glass panel starts being assembled with the vehicle body, and "T4" denotes the timing at which the rearward window glass panel starts being assembled therewith.

As have been described in detail hereinabove, the construction of the apparatus according to the present invention allows a period of time required from the start of coating the window glass 3 with the adhesive B to the assembly thereof with the vehicle body 1 to be always constant ($T_o$) even if the conveyance velocity V of the vehicle body 1 is changed. This presents a uniformity in coating performance of the adhesive leading eventually to a uniformity in the effect on the mounting of the window glass panels on the body. Furthermore, a control system is rendered extremely simple because the system can be constructed basically by the photo tube switches and an operation means for computing periods of time only.

It is further to be noted that the time period $T_o$ required from the start of coating the adhesive to the assembly of the window glass panel 3 can be corrected in accordance with temperature, moisture, and so on.

The present invention may be embodied in other specific forms without departing from the spirit and scope thereof. The present embodiments as have been described hereinabove are therefore to be considered in all respects as illustrative and not restrictive, the scope of the invention being indicated by the appended claims, and all the changes which come within the meaning and range of equivalency of the claims are therefore intended to be encompassed within the spirit and scope of the invention.

What is claimed is:

1. An apparatus for controlling start of coating a substrate with an adhesive prior to assembly of the substrate with an article being conveyed one after another, comprising:

an adhesive coating means for coating the substrate with the adhesive;

a conveyance velocity detection means for detecting a conveyance velocity at which the article is conveyed; and a timing adjustment means for adjusting a timing in which the substrate starts being coated with the adhesive by the adhesive coating means so as to make constant a period of time required from a time for the start of coating the adhesive to a time for the start of assembling the substrate with the article in accordance with a variation in the conveyance velocity of the article.

2. An apparatus as claimed in claim 1, wherein:

the article is a vehicle body;

the substrate is a window glass panel;

a window glass panel assembly station for assembling the window glass panel with the body, the station being disposed in a conveyor line for conveying the body;

a window glass panel assembly robot for assembling the glass panel with the article, a robot being disposed in the window glass panel assembly station;

a window glass panel conveyor line for conveying and feeding the window glass panel to the robot; and an adhesive coating robot for coating the adhesive on the window glass panel conveyed one after another on the window glass panel conveyor line.

3. An apparatus as claimed in claim 2, further comprising an inverting device for inverting a surface of the window glass panel, which is mounted between the window glass panel conveyor line and the window glass panel assembly robot.

4. An apparatus as claimed in claim 3, wherein:

a window glass panel feed table for receiving the glass panel from the inverting device and delivering the glass panel to the/ window glass panel assembly robot, a window glass panel feed table being disposed between the inverting device and the window glass panel assembly robot to place the glass panel inverted by and supplied from the inverting device; and the glass panel placed on the feed table is in a state that a surface of the glass panel on which the adhesive is coated faces downwardly.

5. An apparatus as claimed in claim 2, wherein:

the window glass panel conveyor line comprises a main conveyor line and a preliminary conveyor line, a main conveyor line being to supply the glass panel to the window glass panel assembly robot and a preliminary conveyor line being to supply the glass panel to the main conveyor line;

in which the main conveyor line and the preliminary conveyor line are disposed in a vertically spaced relationship and connected to each other through a vertical conveyor conveying the glass panel in a vertical direction.

6. An apparatus as claimed in claim 5, wherein:

the main conveyor line is provided with the adhesive coating robot; and the preliminary conveyor line is provided with a primer coating robot for coating the window glass panel with a primer.

7. An apparatus as claimed in claim 5, wherein:

the main conveyor line is connected to the vertical conveyor through a carrier; and the carrier is to transfer the glass panel in suspended state while sucking an upper surface of the glass panel.

8. An apparatus as claimed in claim 1, further comprising a substrate assembling robot is provided for assembling at least two of the substrates with the article in a longitudinal direction and which is transferable in a direction in which the article is conveyed.

9. An apparatus as claimed in claim 8, further comprising means for transferring the substrate assembling robot between a first position at which the first substrate is assembled with the article and a second position at which the second substrate is assembled with the article.

10. An apparatus as claimed in claim 9, wherein:

the substrate assembling robot comprises means for receiving the first and second substrates at the second position; and assembles the first substrate with the article prior to the second substrate being assembled with the article.

11. An apparatus as claimed in claim 10, wherein:

the substrate assembling robot stays conveyance of the article at the first position to come in while holding the first substrate.

12. An apparatus as claimed in claim 9, wherein:

the article is a vehicle body;

the substrate is a window glass panel; and wherein the apparatus further comprises a window glass panel assembly station for assembling the window glass panel with the body, the station being disposed in a conveyor line for conveying the body;

a window glass panel assembly robot for assembling the glass panel with the article disposed in the window glass panel assembly station;

a window glass panel conveyor line for conveying and feeding the window glass panel to the robot; and an adhesive coating robot for coating the adhesive on the window glass panel conveyed one after another on the window glass panel conveyor line.

13. An apparatus as claimed in claim 12, wherein:

the substrate assembling robot receives the first and second substrates at the second position; and the first substrate is assembled with the article prior to the second substrate.

14. An apparatus as claimed in claim 13, wherein:

the first substrate is a forward window glass panel and the second substrate is a rearward window glass panel.

15. An apparatus as claimed in claim 2, further comprising:

a conveyor line for conveying a vehicle body provided with a conveyance velocity detecting means for detecting a conveyance velocity of the vehicle body on an upstream side of the glass panel assembly station.

16. An apparatus as claimed in claim 8, wherein the substrate assembly is adapted so as to assemble all the substrates with the article.

17. An apparatus as claimed in claim 1, wherein the conveyance velocity detection means detects the velocity of conveyance of the article prior to the assembly of the article with a part.

* * * * *